United States Patent Office 3,409,424
Patented Nov. 5, 1968

3,409,424
PROPYNONES AS DEFOLIANTS
James L. Brewbaker, Farmington, and John P. Napolitano, Royal Oak, Mich., assignors to Ethyl Corporation, New York, N.Y., a corporation of Virginia
No Drawing. Filed Mar. 1, 1966, Ser. No. 530,778
6 Claims. (Cl. 71—70)

ABSTRACT OF THE DISCLOSURE

A herbitoxic composition for controlling undesirable deciduous vegetation is provided by a composition comprising an aromatic ketoacetylenic compound such as 1,3-diphenyl-propyn-3-one, a surfactant as a dispersant therefor, and a carrier. A method of controlling said vegetation comprises contact the vegetation with the composition of this invention.

---

This invention relates to the control of undesirable vegetation. More specifically, it pertains to a method for treating undesirable plant growth with novel herbitoxic compositions. In particular, this invention relates to combating unwanted vegetation with 1,3-diphenyl-propyn-3-one and derivatives and homologs thereof. In other words, the essence of this invention resides in the discovery that compounds having the basic structure:

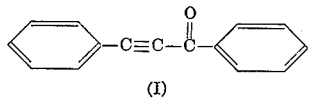

(I)

have desirable herbitoxic properties.

As used herein, the phrase "control of undesirable vegetation" means the partial or total modification of the growth of plants and embraces within its scope, defoliation, and the complete suppression or eradication of plants. The term "undesirable vegetation" refers to plants which are undesirable in a particular locus, as well as plant parts which are undesirable at a particular time. For instance, certain trees may be undesirable in a plot devoted to the profitable growth of another species of trees. In another instance, leaves of cultivated plants, such as cotton plants, may become undesirable at harvest time.

Among the objects of this invention are the provision of novel herbitoxic compositions and novel methods for controlling undesirable vegetation. Further objects are to provide novel herbicidal formulations and methods for killing plants. Additional objects are to provide novel compositions and methods for plant defoliation. Still another object of this invention is to provide compositions which are useful in treating forests. Other objects will be apparent from the following detailed description and appended claims.

The objects of this invention are accomplished by providing new herbitoxic compositions comprising a compound having the formula:

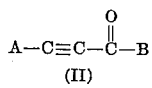

(II)

wherein A and B are identical or dissimilar benzenoid radicals having 6 to about 18 carbon atoms. As used herein, a "benzenoid radical" is a univalent radical derived by removal of a hydrogen atom bonded to a ring carbon atom of benzene or a substituted benzene. A substituted benzene is a compound having a benzene ring substituted with one or more univalent organic radicals other than hydrogen. Preferably, the substituents bonded to the benzene ring of said substituted benzenes are free of acetylenic radicals.

Thus, the active ingredients of this invention can also be represented by the formula:

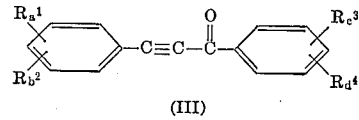

(III)

wherein $a$, $b$, $c$ and $d$ are integers, each having a value of zero or 1; $R^1$, $R^2$, $R^3$ and $R^4$ are substituent groups, such as alkyl, aralkyl, alkenyl, aryl, alkoxy, nitro, halogen, hydroxy or carboxy radicals. Furthermore, $R^1$, $R^2$, $R^3$ and $R^4$ may be selected from carbamoyl, N-substituted carbamoyl, N,N-disubstituted carbamoyl and alkyloxycarbonyl radicals. In addition, the substituent groups represented by the various R radicals in the above formula can be a carboxy acid salt group containing a metal cation, such as sodium, lithium, potassium, magnesium, calcium, zinc, copper, iron, mercury, lead and tin ions.

A preferred active ingredient of this invention is 1,3-diphenyl-propyn-3-one. This compound is represented by the above formula when $a$, $b$, $c$ and $d$ are all equal to zero.

Of the derivatives and homologs of 1,3-diphenyl-propyn-3-one, certain classes are preferred. The compounds of preferred class (i) are represented by Formula III when at least one of $a$, $b$, $c$ and $d$ is equal to one, and $R^1$, $R^2$, $R^3$ and $R^4$ are independently selected from the group consisting of alkyl radicals having 1 to 12 carbon atoms, alkenyl radicals having 2 to 6 carbon atoms, aralkyl radicals having 7 to 12 carbon atoms, alkylphenyl radicals having 7 to 12 carbon atoms and the phenyl radical; such that the total number of carbon atoms in the compounds does not exceed about 40.

The compounds of preferred class (ii) are represented by Formula III when at least one of $a$, $b$, $c$ and $d$ are equal to one, and $R^1$, $R^2$, $R^3$ and $R^4$ are independently selected from alkoxy radicals having 1 to 6 carbon atoms, halogen, hydroxy and nitro radicals.

Preferred class (iii) is represented by Formula III when at least one of $a$, $b$, $c$ and $d$ are equal to one, and $R^1$, $R^2$, $R^3$ and $R^4$ are selected from radicals having the formula:

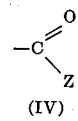

(IV)

wherein Z is selected from —OR$^5$ and —NR$^5$R$^6$ wherein $R^5$ and $R^6$ are hydrogen or an alkyl radical of up to 6 carbon atoms.

The compounds of preferred class (iv) are carboxylic acid salts. They are represented by Formula III when at least one of $a$, $b$, $c$ and $d$ are equal to one and $R^1$, $R^2$, $R^3$ and $R^4$ are carboxy acid salt groups containing a metal ion selected from lithium, sodium, potassium, magnesium, calcium, zinc, copper, iron, lead, tin and mercury. Strictly speaking, carboxylic acid salt groups have the formula:

wherein M is a univalent metal, the formula:

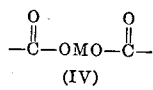

(IV)

when M is divalent, and a similar formula derived from three carboxylic radicals when M is trivalent, and so on. For the sake of simplicity, the carboxylic and salt groups, containing both univalent and polyvalent metals, will be represented herein by Formula (V).

Illustrative and non-limiting examples of typical active ingredients of this invention are listed below.

(1) 1,3-diphenylpropyn-3-one
(2) 1-(4-chlorophenyl)-3-phenylpropyn-3-one
(3) 1,3-bis(4-chlorophenyl)propyn-3-one
(4) 1-(2,4-dichlorophenyl)-3-phenylpropyn-3-one
(5) 1,3-bis(2,4-dichlorophenyl)propyn-3-one
(6) 1-(2,4-dichlorophenyl)-3-(4-chlorophenyl)propyn-3-one
(7) 1-(2-chlorophenyl)-3-(2,4-dichlorophenyl)propyn-3-one
(8) 1-(3-nitrophenyl)-3-phenylpropyn-3-one
(9) 1,3-bis(3-nitrophenyl)propyn-3-one
(10) 1-(3,5-dinitrophenyl)-3-phenylpropyn-3-one
(11) 1-phenyl-3-(3,5-dinitrophenyl)propyn-3-one
(12) 1-(3,5-dinitrophenyl)-3-phenylpropyn-3-one
(13) 1-(4-chlorophenyl)-3-(3-nitrophenyl)propyn-3-one
(14) 1-(2,4-dichlorophenyl)-3-(3-nitrophenyl)propyn-3-one
(15) 1-(2,4-dichlorophenyl)-3-(3,5-dinitrophenyl)propyn-3-one
(16) 1-(2-chlorophenyl)-3-(3,5-dinitrophenyl)propyn-3-one
(17) 1,3-bis(3-nitro-4-chlorophenyl)propyn-3-one
(18) 1-(4-hydroxyphenyl)-3-phenylpropyn-3-one
(19) 1,3-bis(4-hydroxyphenyl)propyn-3-one
(20) 1-(2-chloro-4-hydroxyphenyl)-3-phenylpropyn-3-one
(21) 1-(4-hydroxyphenyl)-3-(4-chlorophenyl)propyn-3-one
(22) 1-(2-hydroxyphenyl)-3-(2,4-dichlorophenyl)propyn-3-one
(23) 1-(3-nitrophenyl)-3-(2-hydroxyphenyl)propyn-3-one
(24) 1-(3-nitrophenyl)-3-(2-hydroxy-4-chlorophenyl)propyn-3-one
(25) 1-(4-methylphenyl)-3-(4-tert-butylphenyl)propyn-3-one
(26) 1-(4-dodecylphenyl)-3-(2-chlorophenyl)propyn-3-one
(27) 1-(3-nitrophenyl)-3-(4-octylphenyl)propyn-3-one
(28) 1-(4-methoxyphenyl)-3-(4-hexyloxyphenyl)propyn-3-one
(29) 1-(2-ethylphenyl)-3-(4-butoxyphenyl)propyn-3-one
(30) 1-(2-bromophenyl)-3-(2-isopropoxyphenyl)propyn-3-one
(31) 1-(4-iodophenyl)-3-(2-hydroxyphenyl)propyn-3-one
(32) 1,3-bis(4-fluorophenyl)propyn-3-one
(33) 1-(4-vinylphenyl)-3-[4-(1-hexenyl)phenyl]propyn-3-one
(34) 1-(2-allylphenyl)-3-(2-chlorophenyl)propyn-3-one
(35) 1-phenyl-3-(2-carboxyphenyl)propyn-3-one
(36) 1-phenyl-3-[2-(methoxycarbonyl)phenyl]propyn-3-one
(37) 1-phenyl-3-(2-butoxycarbonylphenyl)propyn-3-one
(38) 1-phenyl-3-[2-(hexyloxycarbonyl)phenyl]propyn-3-one
(39) 1-phenyl-3-(2-carbamoylphenyl)propyn-3-one
(40) 1-phenyl-3-[2-(dimethylcarbamoyl)phenyl]propyn-3-one
(41) 1-phenyl-3-[2-(hexylcarbamoyl)phenyl]propyn-3-one
(42) 1-(2,4-dichlorophenyl)-3-[2-(butylcarbamoyl)phenyl]propyn-3-one
(43) 1-(2,4-dichlorophenyl)-3-[2-(sodiocarboxy)phenyl]propyn-3-one The active ingredients of this invention can be prepared by methods known in the art. A typical method has been described by Nightingale et al., J. Am. Chem. Soc., 67, 416 (1945). In general, this method consists of reacting sodium with a phenylacetylene to form the corresponding sodium acetylide. This is then reacted with the desired benzoic anhydride to yield the desired product. This method is illustrated by the following equations in which $R^1$, $R^2$, $R^3$ and $R^4$ and $a$, $b$, $c$ and $d$ have the significance previously set forth:

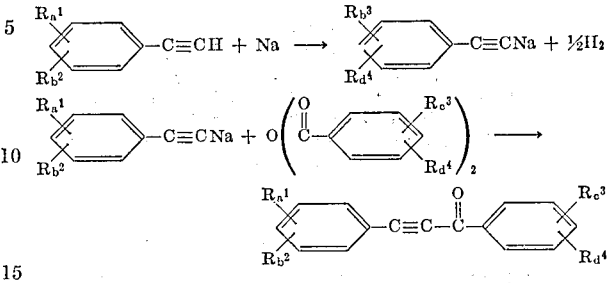

In general, the reactions are conveniently carried out at a temperature of 25–30° C. and in an inert solvent, such as ether. Preferably, the reaction should be carried out under an inert atmosphere. In many instances, the product is separable from the reaction mixture by distillation at reduced pressure.

The following examples are illustrative of the various methods available in the art for preparing the compounds of the present invention. All parts are parts by weight unless otherwise noted.

Example 1

To a reaction vessel, fitted with agitator, reflux condenser and thermometer, was added a mixture of 140 parts of diethyl ether and 9.2 parts metallic sodium cut in small pieces. The mixture was kept under a nitrogen atmosphere. Over a 35 minute period, 40.8 parts of phenylacetylene was added dropwise to the reaction mass while maintaining its temperature at 25 to 30° C. with an ice bath. The reaction mass was then stirred for 5 hours at room temperature. At the end of this time all of the sodium had reacted and a thick white slurry had formed. This slurry was then carefully poured, under nitrogen, into a second reaction vessel (equipped as the first vessel described above) containing 140 parts of diethyl ether and 80.4 parts of benzoic anhydride. During this addition, the temperature of the contents of the second reaction vessel was maintained at about 10° C. While agitating the resultant reaction mass, its temperature was allowed to rise from 10° to about 24° C. over a 2 hour period. Following this, a cold solution of 59.4 parts of 37 percent aqueous hydrochloric acid in 100 parts of water was added to the reaction mass. The mixture was then stirred for 2 hours. The ether layer was then separated and washed with 250 parts of a 5 percent aqueous sodium carbonate solution. The ether layer was then dried over anhydrous magnesium sulfate. The ether layer was then subjected to a vacuum distillation, during which the liquid product, 1,3-diphenylpropyn-3-one ($N_d^{20}=1.6276$) distilled at 180° C. at 5 mm. Hg. The yield was 40 parts or 48 percent of theory based upon phenylacetylene.

Example 2

To a reaction vessel, fitted as in Example 1, is added 400 parts of ether and 23 parts of sodium metal cut in small pieces. Following this, 132 parts of para-methoxyphenylacetylene is added dropwise while agitating and maintaining the temperature of the reaction mass at 25–30° C. The reaction mass is then agitated for 5 hours at room temperature. In a second reaction vessel, fitted as in Example 1, is placed 400 parts of ether and 295 parts of 3-chlorobenzoic anhydride. While agitating the second reaction vessel, the contents of the first reaction vessel are slowly transferred to it under nitrogen, while maintaining the reaction temperature at 10–15° C. While agitating, the temperature is allowed to rise to room temperature over a 2 hour period. Following this, a cold solution of 150 parts of 37 percent aqueous hydrochloric acid in 250 parts of water is carefully added to the contents of the reaction vessel. The ether layer is then separated and washed with 500 parts of a 5 percent sodium carbonate solution. The ether layer is then dried over anhydrous magnesium sulfate. On vacuum distillation, 1 - (4 - methoxyphenyl) - 3 - (3 - chlorophenyl)propyn-3-one is recovered.

In like manner, meta-nitrobenzoic acid anhydride may be employed in the above example in place of 3-chlorobenzoic acid anhydride, to prepare 1-(4-methoxyphenyl)-3-(3-nitrophenyl)propyn-2-one. Similarly, 3,5 - dibromobenzoic acid anhydride may be employed above to yield 1 - (4 - methoxyphenyl) - 3 - (3,5 - bromophenyl)propyn-3-one.

Example 3

To a reaction vessel, equipped as in Example 1, is added 400 parts of diethyl ether and 23 parts of sodium metal cut in small pieces. While agitating and maintaining the temperature at 25–30° C., 270 parts of 3-dodecylphenylacetylene is added dropwise. Following this addition, the reaction mass is agitated at room temperature for 8 hours. To a second reaction vessel is added 400 parts of diethyl ether and 148 parts of phthalic anhydride. Following the procedure employed in previous examples, the contents of the first reaction vessel are transferred to the second reaction vessel, resulting in the formation of the sodium salt of 1-(3,5-dodecylphenyl)-3-(2-carboxyphenyl)propyn-3-one.

In like manner, para-methylphenylacetylene may be employed in the above example to prepare the sodium salt of 1-(4-methylphenyl)-3-(2-carboxyphenyl)propyn-3-one. Furthermore, parachlorophenylacetylene can be employed in the above example producing the sodium salt of 1-(4-chlorophenyl)-3-(2-carboxyphenyl)propyn-3-one. Similarly, 2,4-dichlorophenylacetylene may be used to prepare the sodium salt of 1-(2,4-dichlorophenyl)-3-(2-carboxyphenyl)propyn-3-one.

In addition, other phthalic anhydride derivatives may be employed, such as 4-iodophthalic anhydride, to yield 1 - (3 - dodecylphenyl) - 3 - (1 - carboxy - 4 - iodo phenyl)propyn-3-one. Furthermore, 4,5-difluorophthalic anhydride may be used to produce the sodium salt of 1 - (3 - dodecylphenyl) - 3 - (2 - carboxy - 4,5 - difluorophenyl)propyn-3-one.

Furthermore, the sodium salts of all the above prepared compounds may be converted to the corresponding acid by treatment with hydrochloric acid. Also, using methods known in the art, the acids may be esterified with alcohols, such as methyl alcohol, ethyl alcohol, propyl alcohol, isopropyl alcohol, butyl alcohols, amyl alcohols and hexyl alcohols, to produce the methyl, ethyl, propyl, isopropyl, butyl, amyl and hexyl esters.

Similarly, the acids prepared in the above example may be aminated by common methods known in the art, such as converting the carboxy group to an acid chloride group, by a reaction with thionyl chloride, followed by reaction with ammonia or a primary or secondary amine, such as methylamine, dimethylamine, ethylamine, diethylamine, propylamine, dipropylamine, n - butylamine, sec-butylamine, tert-butylamine, di-n-butylamine, di-sec-butylamine, n-amylamine, isoamylamine, sec-amylamines, di-n-amylamine, di-isoamylamines, n-hexylamine, sec-hexylamines, tert-hexylamines, di-n-hexylamine, and di-sec-hexylamines.

Example 4

To a reaction vessel, fitted with agitator, reflux condenser, thermometer and dropping funnel and maintained under a nitrogen atmosphere, is added 500 parts of tetrahydrofuran and 25 parts of magnesium turnings. While agitating, 171 parts of paramethylbromobenzene is added dropwise to the reaction mass while maintaining its temperature at 25–30° C., forming a Grignard reagent. Following this, a solution of 174 parts β-phenylethylpropiolate in 300 parts of tetrahydrofuran is added dropwise to the reaction mass over a one hour period while maintaining its temperature at 25–30° C. Agitation is continued for two hours at room temperature. Following hydrolysis with 1000 parts of a 5 percent ammonium chloride solution, the product is extracted with two 500 part portions of diethylether and the ether extract subjected to a vacuum distillation, yielding 1-phenyl-3-(4-methylphenyl)propyn-3-one.

Other Grignard reagents may be employed in equal mole quantities in the above examples to give other derivatives. For example, when para-biphenyl magnesium bromide is used, 1-phenyl-3-(para-biphenyl)propyn-3-one is obtained. Similarly, the use of 4-vinylphenyl magnesium chloride yields 1-phenyl-3-(4-vinylphenyl)propyn-3-one. The use of para-methoxyphenyl magnesium bromide will yield 1-phenyl-3-(4-methoxyphenyl)propyn-3-one. Likewise, the use of 2-isopropyl-4-butoxyphenyl magnesium bromide yields 1-phenyl-3-(2-isopropyl-4-butoxyphenyl)propyn-3-one.

Other derivatives of propiolic acid can also be used in the above example. For instance, the use of β-(2,4-dichlorophenyl)ethylpropiolate will yield 1-(2,4-dichlorophenyl)-3-(4-methylphenyl)propyn-3-one. Likewise, the use of β-(3-nitrophenyl)ethylpropiolate will yield 1-(3-nitrophenyl)-3-(4-methylphenyl)propyn-3-one.

Example 5

To a reaction vessel, equipped with agitator, thermometer, reflux condenser and dropping funnel and maintained under a nitrogen atmosphere, is added 500 parts of tetrahydrofuran and 160.5 parts of para-(2-ethyl-4-tert-butylbenzyl)phenylethynyl magnesium chloride. A solution of 140.5 parts of para-hexyloxy benzoyl chloride in 200 parts of tetrahydrofuran is added dropwise. The addition is carried out over a two hour period while maintaining the reaction temperature at 25–30° C. Following hydrolysis with dilute ammonium chloride solution, the product 1-[4 - (2 - ethyl - 4 - tert - butylbenzyl)phenyl] - 3 - (4 - hexyloxyphenyl)propyn-3-one is obtained in good yield.

Example 6

In a reaction vessel, equipped with agitator, reflux condenser, thermometer and dropping funnel, is placed 500 parts of diethyl ether and 46 parts of sodium metal cut in small pieces. Over a one hour period, 118 parts of para-hydroxyphenylacetylene is added dropwise while maintaining the reaction temperature at 25–30° C. In a second reaction vessel, similar to the first reaction vessel, is placed a solution of 246 parts of benzoic acid anhydride in 500 parts of diethyl ether. The contents of the first reaction vessel are then carefully added to the contents of the second reaction vessel under a nitrogen atmosphere, with agitation over a one hour period while maintaining the reaction temperature at 10–15° C. Agitation is continued for 2 hours while allowing the reaction mass to warm to room temperature. The reaction mass is then acidified with a solution of 100 parts of 37 percent aqueous hydrochloric acid in 300 parts of water. The ether extract is then separated and dried over anhydrous magnesium sulfate. Vacuum distillation of the ether extract yields 1-(4-hydroxyphenyl)-3-phenylpropyn-3-one.

Example 7

Following the procedure of Example 3, 272 parts of the sodium salt of 1-phenyl-3-(2-carboxyphenyl)propyn-3-one are prepared. This material is placed in a reaction vessel and 1000 parts of water added thereto, causing the material to dissolve. A solution of 80 parts of copper II sulfate in 200 parts of water are then added, causing the copper II salt of 1-phenyl-3-(2-carboxyphenyl)propyn-3-one to precipitate in good yield. In like manner, the water insoluble salts of other metals, such as magnesium, calcium, zinc, iron, mercury, lead and tin, can be prepared by adding an aqueous solution of a water soluble salt of the metal to the aqueous solution of the forementioned sodium salt of 1-phenyl-3-(2-carboxyphenyl)propyn-3- one. Water insoluble metal salts of other sodium salt derivatives can be prepared in like manner.

In a preferred embodiment, the compositions of this invention contain an active ingredient (a compound of the type formulated and enumerated above and exemplified below) and a surfactant as a dispersant therefor. In a more preferred embodiment, the herbitoxic compositions contain an inert carrier as well as a surfactant and active ingredient. Typical surfactants and carriers employed in this invention are discussed below.

The methods provided by this invention for treating undesirable vegetation comprise contacting living plant tissue with one or more of the active ingredients described and enumerated above and exemplified below. In a preferred embodiment, the vegetation is contacted with a composition comprising one or more active ingredients and a surfactant as a dispersant therefor.

In a more preferred embodiment, the methods of this invention comprise the treatment of undesirable vegetation with a composition comprising one or more active ingredients, a surfactant as a dispersant therefor, and an inert carrier.

The surfactants employed in the instant invention have been commonly referred to in the art as conditioning agents, surface active agent, and surface active dispersing agents. They extend the active ingredient and promote its intimate contact with the vegetation to which it is applied. Furthermore, surfactants aid in the adaptation of the active ingredients for use in conventional application equipment. In general, from 0.5 to 10 percent by weight of a surfactant are employed in the compositions of this invention, however, greater and smaller amounts can be used, if desired. The combination of the active ingredients of this invention with a surfactant produces a herbitoxic composition having a greater effectiveness than could be expected from the activity of the individual components.

Typical examples of surfactants which are suitable for use in this invention are soaps, saponins, gelatin, casein, flour, sulfite lye and synthetic cationic, anionic and nonionic surfactants, and the like. Detailed lists of such agents are set forth by J. W. McCutcheon in "Soap and Chemical Specialties," December 1957; January, February, March and April 1958; and in "Detergent and Emulsifiers Up to Date—1960," John W. McCutcheon, Inc., 475 5th Ave., New York, N.Y. A further discussion of surface active wetting agents is set forth by D. E. H. Frear in "Chemistry of Insecticides, Fungicides and Herbicides," 277–287, published by D. Van Nostrand Company, Inc. (1948).

Anionic surfactants comprise the largest class of surface active agents employed in this invention. Anionic surfactants are excellent wetting and dispersing agents. Soaps, which are probably the best known anionic surfactants, form insoluble materials in the presence of various metal cations, such as magnesium and calcium. Because of this, soaps are not preferred when these ions are present, and the more preferred anionic surfactants used in the compositions of this invention are the synthetic surfactants. This class includes materials such as the sodium salts of sulfonated tallow, sulfonated coconut oil, sulfonated marine animal oils and sulfonated fatty amides. Long chain alkyl sulfates and long chain alkyl sulfonates such as lauryl, cetyl, stearyl, or oleyl-cetyl sulfates or sulfonates are also applicable. Sodium salts of phosphoric esters of fatty acids, sulfonated aromatics (such as sulfonated benzene derivatives, sulfonated naphthalene derivatives and sulfonated anthracene derivatives) can also be used. Sodium salts of alkaryl sulfonates, sulfonated terpenes, and sulfonated alkyl phenols can also be employed. Other preferred anionic surfactants are salts of sulfonated mineral oils, chlorosulfonated paraffinic hydrocarbons, sulfamides of paraffinic hydrocarbons, lignin sulfonates and N-alkyl-N-fatty acid taurates.

Specific examples representative of the foregoing anionic surfactants are sodium dodecyl benzene sulfonate, sodium isopropyl naphthalene sulfonate (marketed under trademark "Aerosol OS" by American Cyanamid), the dioctyl ester of sodium sulfosuccinic acid (marketed under trade-name "Aerosol OT" by American Cyanamid), the bis-tridecyl ester of sodium sulfosuccinic acid (marketed under trademark "Aerosol TR" by American Cyanamid). Other examples are sodium aromatic sulfonate oxides such as those marketed by Nopco Chemical Company under the trade-names "Agrimul N4R," "Agrimul N4S" and "Agrimul TL." Still other examples are the sodium salts of the sulfate esters of an alkyl phenoxypolyethyleneoxyethanol, such as the products marketed by Antara Chemicals under the trade-names "Alipal CO-433" and "Alipal CO-436," and sodium salts of modified alkyl phosphate ester such as "Alipal MC-470," another product of Antara Chemicals. Further specific examples of suitable anionic surfactants may be found in the previously cited "Detergents and Emulsifiers Up to Date—1960."

Another class of surfactants suitable for use in many of the compositions of this invention is nonionic surfactants. This group of surfactants is especially useful in the preparation of emulsifiable oil formulations. When employed in these formulations, nonionic surfactants are extremely effective in emulsifying the oil formulation in an aqueous medium. Some examples of nonionic surfactants are polyglycol esters, polyoxyethyleneoxidealkylphenol, alkylaryl polyester alcohol, propyleneglycol monostearate, glyceryl monostearate, fatty alkylal amide condensates, coconut fatty alkylal amide, lauric alkylal amide. Many more examples of suitable nonionic detergents are listed in the forementioned "Detergents and Emulsifiers Up to Date," supra.

Saponins are glucosides occurring in several species of plants, such as soapwort (*Saponaria officinalis*). The saponins can be hydrolyzed by mineral acids to yield sugars, such as glucose, galactose and arabinose together with sapogenins. Saponins form colloids with water and are effective nonionic detergents because they have the effect of reducing the surface tension of water.

Gelatins are proteins of animal origin which are used as an adjuvant in herbicidal compositions. Gelatins function as surface active agents inasmuch as they lower the surface tension of water while at the same time performing the further function of acting as sticking agents, causing the plant growth regulant compound to remain in intimate contact with the plant tissue over a prolonged period.

Casein is another protein preparation sometimes used in herbicidal compositions. The usual source of casein is milk. Casein, like gelatin, performs the dual function of both lowering the surface tension of water and acting as a sticking agent.

Flour also contains proteins similar to those found in gelatin and casein and has been used as both a wetting and sticking agent. Sulfite lye is a by-product of the paper industry. It contains the water soluble portions of wood pulp and when concentrated forms a viscous liquid or dry powder. It is known to contain ligno sulfonic acid which is probably the surface active agent responsible for its beneficial properties.

The materials commonly known as carriers comprise another type of ingredient which are preferably employed in the compositions of this invention. The purpose of a carrier is to extend and facilitate the application of the active ingredient to the vegetation upon which it is applied. In general, carriers may be of two types, viz solids and liquids. Liquid carriers include well-known liquids such as water and various organic formulations. Typical liquid organic carriers are petroleum fractions such as kerosene and diesel fuel, aromatics such as benzene and toluene, ketones such as acetone and methylethylketone, esters such as amyl acetate, octyl acetate, and the like.

Typical solid carriers are inert solid extenders of mineral origin such as fuller's earth, kaolin, bentonite, China clay, various magnesium silicates, gypsum, pumice, mica, talc, attapulgite clay, and the like. Inert extenders of vegetable origin, such as soybean flour, tobacco flour, ground walnut shells, ground pecan shells and the like, can also be employed.

The herbicidal compositions of the present invention can also beneficially contain other adjuvants. Examples of such further adjuvants are corrosion inhibitors, perfumes, dyes, odor-masking agents and stabilizers. In addition, other herbicidal, fungicidal or insecticidal agents might be mixed with the herbicidal compositions of this invention in order to obtain enhanced or dual effects from the application of the resultant composition.

The type of herbitoxic composition is largely dictated by the type of carrier employed. For example, the use of liquid carriers yields liquid formulations, such as solutions, suspensions, emulsions, and the like. Oil-in-water emulsions are the preferred type of emulsion, however, water-in-oil types can be employed, if desired. The use of solid carriers yields compositions such as wettable powders, granules and dusts. These various formulations are discussed below.

One formulation for applying the active compounds of this invention to undesirable plant is a solution or suspension of the active compound in a suitable aqueous or organic medium. In these formulations the solution or suspension of the compounds is contacted with the plant tissue whereupon the active ingredients exert their plant controlling effect. The organic medium may be a volatile solvent or it may be a higher boiling solvent such as kerosene.

When using a solution or suspension formulation a preferred active ingredient concentration range is from about 0.5 to 100 parts by weight active ingredient per 250 parts by weight of formulation, although more or less can be used. A more preferred concentration range is from about 1 to 50 parts by weight active ingredient per 250 parts of formulation. A most preferred concentration range is from about 1 to 10 parts by weight active ingredient per 250 parts of formulation.

Emulsifiable oils are preferred formulations comprising the active ingredients of this invention. These are solutions or suspensions of the active compound in water-immiscible solvents together with a surface active agent. In these formulations the water-immiscible solvent is the carrier. Suitable water-immiscible solvents for the active compound of this invention are hydrocarbons, such as kerosene or xylene, and water-insoluble ethers such as dibutylcarbitol and dibutylcellosolve, esters such as amylacetate and octylacetate, and ketones such as methylethylketone or dioctylketone.

The surface active agents employed in formulating emulsifiable oils are those which promote the formulation of emulsions. Such surface active agents are listed in the previously cited J. W. McCutcheon, "Soap and Chemical Specialties." The preferred active agents used in preparing emulsifiable oils are the non-ionic surfactants such as alkyl-, aryl-, poly-ethoxy alcohols, polyoxyethylene sortibol, sorbitan fatty acid esters, polyethylene glycol fatty acid esters, fatty alkylol amide condensates, amine salts of fatty alcohol sulfates, long chain alcohols, and anionic surfactants such as oil soluble petroleum sulfonates.

A preferred active ingredient concentration of the emulsifiable oil formulations of the present invention is from about 10 to about 90 weight percent. A more preferred active ingredient concentration in these formulations is from about 20 to about 80 weight percent. A most preferred active ingredient concentration in the emulsifiable oil formulations of this invention is from about 25 to about 50 weight percent.

A preferred water immiscible solvent concentration in the emulsifiable oil formulations of this invention is from about 10 to about 90 weight percent. A more preferred water immiscible solvent concentration is from about 40 to about 75 weight percent. A most preferred water immiscible solvent concentration is from about 50 to about 70 weight percent.

A preferred surfactant concentration in the emulsifiable oil formulations of the present invention is from about 0.5 to about 15 weight percent. A more preferred surfactant concentration is from about 1 to about 10 weight percent. A most preferred surfactant concentration in the emulsifiable oil formulations of this invention is from about 1 to about 5 weight percent. However, since the surfactant requirement will vary depending upon the active ingredient employed and the water immiscible solvent used, it is apparent that greater or lesser amounts of these ingredients can be employed, if desired.

In practice, the emulsifiable oil compositions of this invention are emulsified in water and the resultant emulsion used in the method of this invention in controlling undesirable vegetation. It is apparent that the concentration of the emulsifiable oil composition in the emulsion will be a function of the application rate desired and the concentration of active ingredient in the emulsifiable oil. A preferable quantity of the emulsifiable oil compositions emulsified in water is from about 2 to about 40 parts by weight of the emulsifiable oil composition per 250 parts by weight of final emulsion. A most preferred emulsifiable oil concentration in the emulsions used in controlling undesired vegetation is from about 4 to about 20 parts by weight emulsifiable oil compositions per 250 parts by weight of emulsion.

The compositions of this invention may be formulated in the form of wettable powders. These are water dispersible compositions which contain, in addition to the active compound, an inert solid extender and one or more surfactants which perform the functions previously set out. The preferred inert solid extenders used in this invention are of mineral origin, such as fuller's earth, kaolin, bentonite, China clay, and the like. The most preferred inert extenders used in the wettable powders of this invention are kaolin, bentonites and magnesium silicates.

Surface active agents which can be used in combination with the other ingredients employed in producing wettable powders include all types previously described. The preferred surface active agents employed in the wettable powders are those that can be prepared in the solid form because these facilitate the blending of the wettable powder compositions. The most preferred wetting agents are anionic surfactants such as alkyl benzene sulfonates, alkyl napthalene sulfonates, sulfonated fatty alcohols, sulfonated amines, sulfonated acid amides, sulfonated aliphatics, petroleum sulfonates, sodium lignin sulfonates, mixed alkylaryl sulfonates, and sodium N-methyl-N-fatty acid taurates.

Occasionally, more than one of the above surface active agents are employed in the formulation of a single wettable powder. In these instances, one of the surface active agents may be particularly useful in dispersing the inert extender in an aqueous suspension, while the other surface active agent may be particularly effective in wetting the plant tissue to which the final suspension is contacted.

A preferred active ingredient concentration of the wettable powder formulations of this invention is from about 10 to about 90 weight percent. A more preferred active ingredient concentration is from about 20 to about 80 weight percent, and a most preferred active ingredient concentration in the wettable powder formulations of this invention is from about 50 to about 80 weight percent.

A preferred surfactant concentration in the wettable powder formulations of this invention is from about 0.5 to about 15 weight percent. A more preferred surfactant concentration is from about 1 to about 10 weight percent, and a most preferred surfactant concentration is from about 1 to about 5 weight percent.

A preferred quantity of inert carrier used in the wettable powder formulations of this invention is from about 10 to about 90 weight percent. A more preferred carrier concentration is from about 10 to about 75 weight percent, and a most preferred carrier concentration is from about 10 to about 50 weight percent.

For application in the control of undesirable vegetation, the wettable powder compositions of this invention are first dispersed in a liquid medium. Although nonaqueous liquid media may be used, a preferred liquid medium is water. It is again apparent that the quantity of wettable powder composition dispersed in the liquid medium is a function of the application rate desired and the concentration of active ingredient in the wettable powder. A preferred concentration range of the wettable powder compositions of this invention in aqueous dispersions of these compositions is from about 1 to about 20 parts by weight of wettable powder per 250 parts by weight of aqueous dispersion, and a most preferred concentration range is from about 2 to about 15 parts by weight of wettable powder per 250 parts by weight of aqueous dispersion.

Dusts are powder formulations which are intended for application in the dry form. Dust should be free flowing and have a high density. A high density promotes rapid settling of the dust and minimizes the transport of the dust vehicle by air currents. Dust formulations contain the active compounds and an inert extender. In addition, dust formulations usually contain wetting agents. The inert solid extenders used in dusts include both organic and inorganic powders which preferably are free flowing and possess high bulk density. The preferred inert solid extenders used in dust formulations are dense clays, talcs, pyrophyllite, "Phospho Dust" (trademark of the American Agricultural Chemical Company), and such organic materials as tobacco dust and ground walnut shells.

The preferred surface active agent employed in dust formulations are those available in the dry solid form. The most preferred surface active agents used in dust formulations are the same as those used in the previously described wettable powder formulations. Actually, the wettable powders previously described can be used as dusts. The major difference between wettable powders and dusts is that wettable powders contain a higher concentration of active ingredient and surface active agent and dusts preferably have a higher bulk density.

Dust formulations usually contain small amounts of a grinding aid which facilitates the preparation of such dusts. Typical grinding aids are diatomaceous silica, silicas, calcium and magnesium silicates, and attapulgite clay.

A preferred active ingredient concentration employed in the dust compositions of this invention is from about 0.1 to about 25 weight percent. A more preferred active ingredient concentration is from about 1 to about 20 weight percent, and a most preferred active ingredient concentration is from about 1 to about 10 weight percent.

A preferred surfactant concentration used in the dust compositions of this invention is from about 0.01 to about 5 weight percent. A more preferred surfactant concentration is from about 0.1 to about 2 weight percent, and a most preferred surfactant concentration used in the dust compositions of this invention is from about 0.5 to about 1 weight percent. The balance of the dust compositions of this invention comprise inert free flowing dust and any other adjuvants that might be desired, such as corrosion inhibitors, anti-foam agents, dyes, and the like.

Granule formulations are occasionally employed to contact the compositions of the present invention with living plant tissue. Granules are compositions of macroscopic dimension containing the active ingredient and generally a surface active agent. Suitable carriers for granule formulations are clays, pyrophyllite and vermiculite. The preferred carriers are of two types. The first are porous absorbtive preformed granules such as preformed and screened granular attapulgite or heat expanded granular screened vermiculite. On either of these a solution of the active ingredient can be sprayed and will be absorbed at concentrations up to about 25 percent of the total weight. The second type of carriers are initially powdered kaolin, hydrated attapulgite clay or bentonite. These are blended with the active compounds to give mixtures that are granulated and dried to yield granular material with the active material distributed uniformly throughout the mass. Such granules can also be made with 25–30 weight percent active ingredient, but, more frequently, these formulations contain about 10 weight percent active ingredient. The usual size range of the granular formulations is from 15 to 30 mesh.

The most suitable surface active agents for the granular formulations of this invention depend upon the type of granule used. When preformed granules are sprayed with active material in liquid form the most suitable surface active agents are non-ionic liquid surface active agents immiscible with the solvent. These are generally known in the art as emulsifying agents. Examples of such agents are alkaryl polyether alcohols, alkyl polyether alcohols, polyoxyethylene sorbitol, sorbitan fatty acid esters, polyethylene-glycol fatty esters, fatty alkyllol amide condensates, and petroleum or vegetable oil sulfonates.

A preferred active ingredient concentration of the granular formulations of this invention is from about 1 to about 50 weight percent. A more preferred active ingredient concentration is from about 1 to about 40 weight percent, and a most preferred active ingredient concentration is from about 5 to about 30 weight percent.

A preferred surfactant concentration employed in the granular formulations of this invention is from about 0.01 to about 10 weight percent. A more preferred surfactant concentration is from about 0.1 to about 5 weight percent, and a most preferred surfactant concentration is from about 0.1 to about 1 weight percent. The balance of the granular formulations is preferably made up of about 15 to 30 mesh particulate inert mineral carrier.

The compounds of this invention are also effective when formulated in aerosol formulations. In these formulations the active compounds are dissolved in an extremely volatile solvent maintained under pressure in a confined space. Examples of volatile solvents used in these formulations are halogenated hydrocarbons, such as tetrafluoromethane, hexafluoroethane, mixed halogenated hydrocarbon compounds containing fluorine and chlorine, such as difluorodichloromethane, pentafluoromethane, and the like. In some aerosol formulations other materials such as carbon dioxide, sulfur dioxide, hydrogen sulfide and ammonia can be used. When such compounds are included in the formulation carbon dioxide is usually preferred.

One method of preparing such aerosol formulations comprises introducing the active compounds of this invention into a pressure cylinder and later introducing the volatile solvent under pressure, followed by mixing of the contents to obtain uniform solution. If desired, smaller containers can then be filled from the cylinder in which the formulation is prepared. In many cases, it is desirable to add a second solvent to the volatile solvent of the type described above so as to more readily dissolve the active compounds. Examples of such secondary solvents are benzene, acetone, carbon tetrachloride, and the like.

When aerosol formulations are discharged into the atmosphere in the form of a fine mist the volatile solvent rapidly evaporates, leaving the active compounds of this invention suspended in the form of an aerosol. In like manner, when the aerosol formulations are contacted with the surface of a plant the volatile solvent rapidly evaporates, leaving the active compounds of this invention in intimate contact with the plant tissue.

The active ingredients described in this invention are also useful in colloidal formulations. A colloidal formulation is prepared by passing a mixture of the active ingredient, a hydrocarbon solvent and a large amount of water through a colloid mill until homogenation of the oil and water is achieved.

The compounds used in the following Examples 8–19 will have the designation given below:

(A) 1,3-bis(2,4-dichlorophenyl)propyn-3-one
(B) 1-(2,4-dichlorophenyl)-3-(3-nitrophenyl)propyn-3-one
(C) 1,3-diphenylpropyn-3-one
(D) 1-(2-hexyloxycarbonylphenyl)-3-(2,4-dichlorophenyl)propyn-3-one
(E) 1-(4-nitrophenyl)-3-(2,4-dichlorophenyl)propyn-3-one
(F) 1-(2,4-dichlorophenyl)-3-(2-butoxycarbonylphenyl)propyn-3-one
(G) 1-(2,4-dibromophenyl)-3-[2-(N-methylcarbonyl)phenyl]-propyn-3-one
(H) 1,3-bis(2,4-dinitrophenyl)propyn-3-one
(I) Stannous salt of 1-phenyl-3-(2-carboxyphenyl)propyn-3-one
(J) 1,3-biphenylpropyn-3-one
(K) 1-(2,4-diiodophenyl)-3-(4-chlorophenyl)propyn-3-one
(L) 1,3-bis(2,4-di-tert-butylphenyl)propyn-3-one The following examples serve to illustrate the herbitoxic formulations of this invention. All percentages are percent by weight.

Example 8

| | Percent |
|---|---|
| Compound A | 50 |
| Bentonite | 49 |
| Sodium alkyl benzene sulfonate | 1 |

The above wettable powder is prepared by blending the dry components and grinding until substantially all of the particles are smaller than 50 microns.

For application, the above wettable powder is dispersed in water in quantities equivalent to one pound of active ingredient per 30 gallons of water. The dispersion so formed is conveniently applied by the use of any of the various commercial sprayers.

Example 9

| | Percent |
|---|---|
| Compound B | 90 |
| Sodium alkyl naphthalene sulfonate | 0.5 |
| Kaolin | 9.5 |

The above wettable powder is prepared in the same manner as in Example 8. For application, it is dispersed in water at a rate equivalent to 10 pounds of active ingredient per 30 gallons of water.

Example 10

| | Percent |
|---|---|
| Compound C | 10 |
| Sodium lignin sulfonate | 10 |
| Attapulgite clay | 80 |

The above wettable powder is prepared in the same manner as in Example 8. For application, it is dispersed in water at a rate equivalent to 5 pounds of active ingredient per 30 gallons of water.

In the above example similar formulations may be prepared containing 20, 30, 40, 50, 60, 70, 80 or 90 percent Compound C and correspondingly smaller amounts of carrier.

Example 11

| | Percent |
|---|---|
| Compound D | 10 |
| Talc | 80 |
| Diatomaceous silica | 8 |
| Fatty acid amides | 2 |

The above dust is prepared by first grinding together the active ingredients, diatomaceous silica and fatty acid amide and then blending in the talc and thoroughly mixing.

This dust formulation can be applied using a tractor or airplane-mounted duster, at a rate of about 5 pounds of active ingredient per acre.

Example 12

| | Percent |
|---|---|
| Compound E | 20 |
| Magnesium silicate | 5 |
| Calcium phosphate dust | 74 |
| Petroleum sulfonates (sodium salt) | 1 |

The above dust is prepared in a manner similar to Example 11. It is conveniently applied to plant tissue using a tractor or aircraft-mounted duster.

Example 13

| | Percent |
|---|---|
| Compound F | 25 |
| Diesel fuel | 65 |
| Alkylaryl polyether alcohols | 10 |

The above emulsifiable oil is prepared by mixing the components until a homogenous solution results.

The above composition is conveniently applied by dispersing the composition in water at a rate equivalent to two pounds of active ingredient per 30 gallons of water. It may then be applied using any suitable commercial sprayer.

In the above example similar formulations may be prepared containing 10, 20, 30, 40, 50, 60, 70, 80 or 90 percent Compound F and correspondingly smaller amounts of diesel fuel.

Example 14

| | Percent |
|---|---|
| Compound G | 35 |
| Xylene | 60 |
| Polyoxyethylene sorbitol | 5 |

The above emulsifiable oil composition is prepared in the same manner as in Example 13. It is conveniently applied to plant tissue using a suitable tractor or airplane-mounted sprayer.

Example 15

| | Percent |
|---|---|
| Compound H | 50 |
| Amyl acetate | 49 |
| Polyethylene glycol fatty acid esters | 1 |

The above emulsifiable oil composition is prepared in the same manner as in Example XIV. For application, it is dispersed in water at a rate equivalent to about 5 pounds of active ingredient per 30 gallons of water. It may then be applied using any suitable commercial sprayer.

Example 16

| | Percent |
|---|---|
| Compound I | 30 |
| Sodium alkyl naphthalene sulfonate | 5 |
| 15–30 mesh attapulgite | 65 |

The above granular composition is prepared by first dissolving the active ingredient and surface active agent in water and then spraying the solution on the carrier. Following this, the granules are dried. It may then be applied to plant tissue at a rate of from 1 to 10 pounds of active ingredient per acre.

Example 17

| | Percent |
|---|---|
| Compound J | 5 |
| Alkaryl polyether alcohols | 1 |
| 15–30 mesh Attaclay | 94 |

The above granular composition is prepared in the same manner as employed in Example 16.

Example 18

Into a cylinder rated at 100 p.s.i.g. working pressure is introduced 10 parts of Compound K. The cylinder is then made pressure tight except for one opening, through which is introduced a mixture of 10 parts of acetone and 50 parts of dichlorodifluoromethane, from a container holding this material under 2000 p.s.i.g. The cylinder into which the ingredients have been introduced is then sealed off and shaken to give a uniform solution of the active compound in the volatile solvents. When sprayed into the atmosphere, this solution will form an effective aerosol of the active compound employed.

Example 19

A colloidal formulation is prepared by passing a mixture of 10 parts of Compound L, 100 parts of kerosene, 1000 parts of water and 1 part of mannitan monooleate through the colloid mill until homogenation of the oil in water is achieved.

Examples 20 thru 535

Compounds 1–43 set forth above are incorporated, one at a time, in each of the foregoing Examples 8 thru 19.

The compositions of this invention are extremely useful when employed in the method of this invention for controlling the growth of undesirable vegetation. Not only are they phytotoxic to many undesirable plants, but they are also useful as defoliants. The compositions of this invention are active as plant growth regulants at rates as low as one-tenth pound of active ingredient per acre. A preferred application rate is from 1 to 60 pounds of active ingredient per acre, and a most preferred application rate is from 5 to 10 pounds of active ingredient per acre. Higher or lower rates can be employed, depending upon the effect that the particular user desires to accomplish.

The compositions of the present invention are usually contacted with the leaves and stems of growing plants in the term's broadest sense, but can be applied to soil to obtain preemergence herbitoxic effects.

As appreciated in the art, the morphological effect obtained with the active ingredients of this invention may be influenced by the application rate, ambient temperature, humidity and the time of the life cycle of the plant to which the compositions are applied. The effect usually desired of plant growth regulators is either defoliation or complete eradication of undesirable species. It is in these particular applications that the compositions of this invention are most useful. The following tests were carried out in order to demonstrate the useful properties of the compositions of this invention.

In the tests, the compounds were formulated as follows. Each compound was weighed into a small aluminum cup. The material was then washed into small beakers with about 5 ml. of acetone, followed by 15 ml. of water, giving a total volume of 20 ml. A quantity of this material containing 31 mg. of the test compound was then removed and water added to it to bring its volume to 11 ml. At this point, 0.5 ml. of a 1 weight percent solution of Triton X–155 was added to the test solution and its volume then raised to 15 ml. of the addition of water. When this test solution is sprayed over an area of one-third square yard it approximates an application rate of 30 gallons per acre containing one pound of test chemical per acre.

In some experiments the test compound was merely dissolved in acetone, so that 12 ml. of acetone solution contained 31 mg. of test compound.

The spray chamber used in carrying out subsequent tests was about 36 inches wide, 18 inches deep and 26 inches high. It was made of clear plastic and the front of the chamber had sliding doors suitable for placing plants in and removing plants from the chamber. The top of the chamber had a hole for introducing the spray.

The compounds were examined by spraying then on 14-day old Black Valentine bean plants at a rate equivalent to one pound of test compound per acre.

In the following Table I, the effectiveness of the compounds of this invention are expressed in terms of their phytotoxicity and their ability to cause abscission (defoliation). The abscission value (A) is expressed in terms of the percentage drop of the total leaves on the plant. At the time of spraying, the bean plants usually have two primary leaves. However, during the 14 days the plant is observed following spraying, two more (trifoliate) leaves usually emerge. Dropping of the two primary leaves would be recorded as 50 percent abscission. Dropping of all four leaves would be recorded as 100 percent abscission. Actually, dropping of the two primary leaves would constitute a total drop of all leaves actually contacted with the test compound.

Phytotoxicity (P) is a measure of leaf damage (not to be confused with leaf droppage) and is estimated visually on a scale from 0 to 11, where 0 indicates no effect and 11 indicates all leaves killed. It is possible for a test chemical to have a phytotoxicity rating of 11 and yet have an abscission rating of 0, which means that although all leaves were killed they remained on the plant.

The following Table I records the results obtained when a test formulation containing 1,3-diphenylpropyn-3-one was contacted with the previously described Black Valentine bean plants at a rate equivalent to one pound per acre. Results are given for both the water and acetone formulation previously described. Observations were made at 4, 8 and 13 days. A controlled test was run at the same time on DEF (a patented product of Chemagro, SSS tributyl-phosphoro-trithioate) a commercial defoliant.

TABLE I.—ABSCISSION AND PHYTOTOXICITY RATINGS OF 1,3-DIPHENYLPROPYN-3-ONE ON BLACK VALENTINE BEANS

| Diluent | 4 days | | 8 days | | 13 days | | DEF at 13 days |
|---|---|---|---|---|---|---|---|
| | A | P | A | P | A | P | A |
| Water | 0 | 6 | 13 | 6 | 27 | 5 | 29 |
| Acetone | 0 | 6 | 3 | 6 | 29 | 4 | -------- |

As the above table shows, 1,3-diphenylpropyn-3-one accomplishes about the same defoliation rate on Black Valentine beans as is obtained with a present commercial defoliant.

Further tests were carried out to demonstrate the selectivity of the compositions of this invention. This procedure consisted of formulating the test compound in either water or acetone mixtures as previously described. The formulated test compounds were then sprayed on seedlings of the woody species, pin oak, American elm, euonymus and boxwood at rates equivalent to 2 and 10 pounds of test compound per acre. The seedlings were observed at the end of 3, 8 and 13 days. The extent of abscission was rated as either light (L), moderate (M), severe (S), or total (T). The phytotoxicity was rated on the same scale (0 to 11) as was used in the Black Valentine bean tests. The following Table II records the results obtained when 1,3-diphenylpropyn-3-one was contacted with the exposed living tissue of the above listed woody species, at rates equivalent to 2 and 10 pounds per acre.

TABLE II.—ABSCISSION AND PHYTOTOXICITY RATINGS OF 1,3-DIPHENYLPROPYN-3-ONE ON DECIDUOUS AND EVERGREEN TREES

| | 3 days | | 8 days | | 13 days | |
|---|---|---|---|---|---|---|
| | A | P | A | P | A | P |
| Pin Oak: | | | | | | |
| 2 lbs./acre | 0 | 8 | S | 8 | S | 5 |
| 10 lbs./acre | 0 | 9 | S | 11 | T | -------- |
| American Elm: | | | | | | |
| 2 lbs./acre | 0 | 4 | 0 | 7 | S | 11 |
| 10 lbs./acre | 0 | 7 | L | 9 | T | -------- |
| Euonymus: | | | | | | |
| 2 lbs./acre | 0 | 0 | 0 | 0 | 0 | 0 |
| 10 lbs./acre | L | 1 | L | 0 | L | 0 |
| Boxwood: | | | | | | |
| 2 lbs./acre | 0 | 2 | 0 | 1 | 0 | 0 |
| 10 lbs./acre | 0 | 2 | 0 | 2 | 0 | 0 |

The above results demonstrate that the compositions of this invention are extremely phytotoxic to deciduous trees such as oak and elm, but have very little effect on evergreen species, such as euonymus and boxwood. After 13 days, the oak trees showed severe abscission and about an almost 50 percent leaf kill at the extremely low application rate of 2 pounds per acre. Elm was even more susceptible, showing, at 13 days, severe leaf abscission and total leaf kill, at the same 2 pounds per acre application rate. At a rate of 10 pounds per acre, both oak and elm suffered not only complete leaf kill but total abscission. In cultivated pine forests, oak and elm are undesirable species that compete with pine seedlings and interfere with the development of pine timber stands. A compound capable of killing the deciduous species, oak and elm, while not affecting the evergreen species is extremely valuable.

This invention can be extended to the treatment of species of plants other than those mentioned above, such as algae.

Having fully described the compositions of this invention and the methods of using these compositions, it is desired that this invention be limited only within the spirit and scope of the following claims.

1. A method of controlling undesirable deciduous vegetation, said method comprising contacting said vegetation with a herbicidal amount of a compound having the formula:

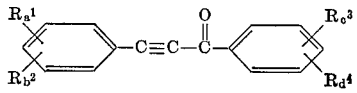

wherein $a$, $b$, $c$, and $d$ are integers, each independently having a value of 0 to 1; and $R^1$, $R^2$, $R^3$, and $R^4$ are independently selected from the group consisting of alkyl radicals containing 1–12 carbon atoms, alkenyl radicals containing 2–6 carbon atoms, alkylphenyl radicals containing 7–12 carbon atoms, and the phenyl radical, such that the total number of carbon atoms in the molecule does not exceed about 40.

2. The method of claim 1 wherein said compound has the formula:

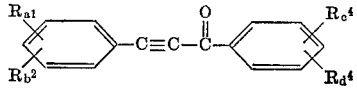

wherein $a$, $b$, $c$, and $d$ are integers, each independently having a value of 0 to 1 such that their total is from 1 to 4; and $R^1$, $R^2$, $R^3$, and $R^4$ are independently selected from the group consisting of alkoxy radicals containing 1–6 carbon atoms, hydroxy, halogen, and nitro radicals.

3. The method of claim 1 wherein said compound has the formula:

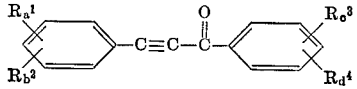

wherein $a$, $b$, $c$, and $d$ are integers, each independently having a value of 0 to 1 such that their total is from 1 to 4; and $R^1$, $R^2$, $R^3$, and $R^4$ are independently selected from the group consisting of radicals having the formula:

wherein Z is selected from the group consisting of $OR^5$ and $NR^5R^6$, wherein $R^5$ and $R^6$ are independently selected from the group consisting of hydrogen and alkyl radicals containing 1–6 carbon atoms.

4. The method of claim 1 wherein said compound has the formula:

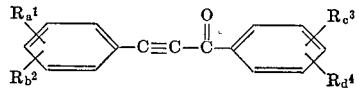

wherein $a$, $b$, $c$, and $d$ are integers, each independently having a value of 0 to 1 such that their total is from 1 to 4; and $R^1$, $R^2$, $R^3$, and $R^4$ are independently selected from the group consisting of radicals having the formula:

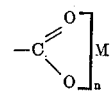

wherein M is a metal cation selected from the group consisting of lithium, sodium, potassium, magnesium, calcium, zinc, copper, iron, lead, tin, and mercury, and $n$ is the valence of M.

5. The method of claim 1 wherein said compound is 1,3-diphenyl-propyn-3-one.

6. Method of controlling undesirable deciduous vegetation in a stand of evergreen species, said method comprising contacting said deciduous vegetation with a herbicidal amount of diphenyl-propyn-3-one.

References Cited

UNITED STATES PATENTS

| | | | |
|---|---|---|---|
| 3,067,022 | 12/1962 | Nault | 71—123 |
| 3,082,242 | 3/1963 | Miller et al. | 71—106 |
| 2,801,160 | 7/1957 | Iserson | 71—70 |
| 3,123,462 | 3/1964 | Duggins et al. | 71—70 |
| 3,295,948 | 1/1967 | Smith et al. | 71—70 |

FOREIGN PATENTS 572,020   3/1959   Canada.

OTHER REFERENCES

Nightingale et al.: "The Synthesis of Acetylenic Ketones, etc."

Tuerck et al.: "Reaction of Acetylene Derivatives with Hydrazoic Avid" (April 1965), CA 63 (1965), pp. 14841 and 14842.

Fontaine et al.: "Preparation and I.R. Spectrographic Study of Some α Acetylenic and α,α′-diacetylenic Ketones," (1962) CA 58 (1963) p. 12451.

Iwai et al.: "Ketones," CA 55 p. 11367 (1961) Japan 11,828–9 (1960).

LEWIS GOTTS, *Primary Examiner.*

G. HOLLRAH, *Assistant Examiner.*

UNITED STATES PATENT OFFICE
CERTIFICATE OF CORRECTION

Patent No. 3,409,424            November 5, 1968

James L. Brewbaker et al.

It is certified that error appears in the above identified patent and that said Letters Patent are hereby corrected as shown below:

Column 1, line 16, "contact" should read -- contacting --. Column 2, line 62, the structural formula should be numbered -- V --. Column 8, lines 28 and 29, "alkylal", each occurrence, should read -- alkylol --. Column 17, line 36, "$R_c^4$" should read -- $R_c^3$ --.

Signed and sealed this 17th day of March 1970.

(SEAL)
Attest:

Edward M. Fletcher, Jr.            WILLIAM E. SCHUYLER, JR.
Attesting Officer                   Commissioner of Patents